UNITED STATES PATENT OFFICE.

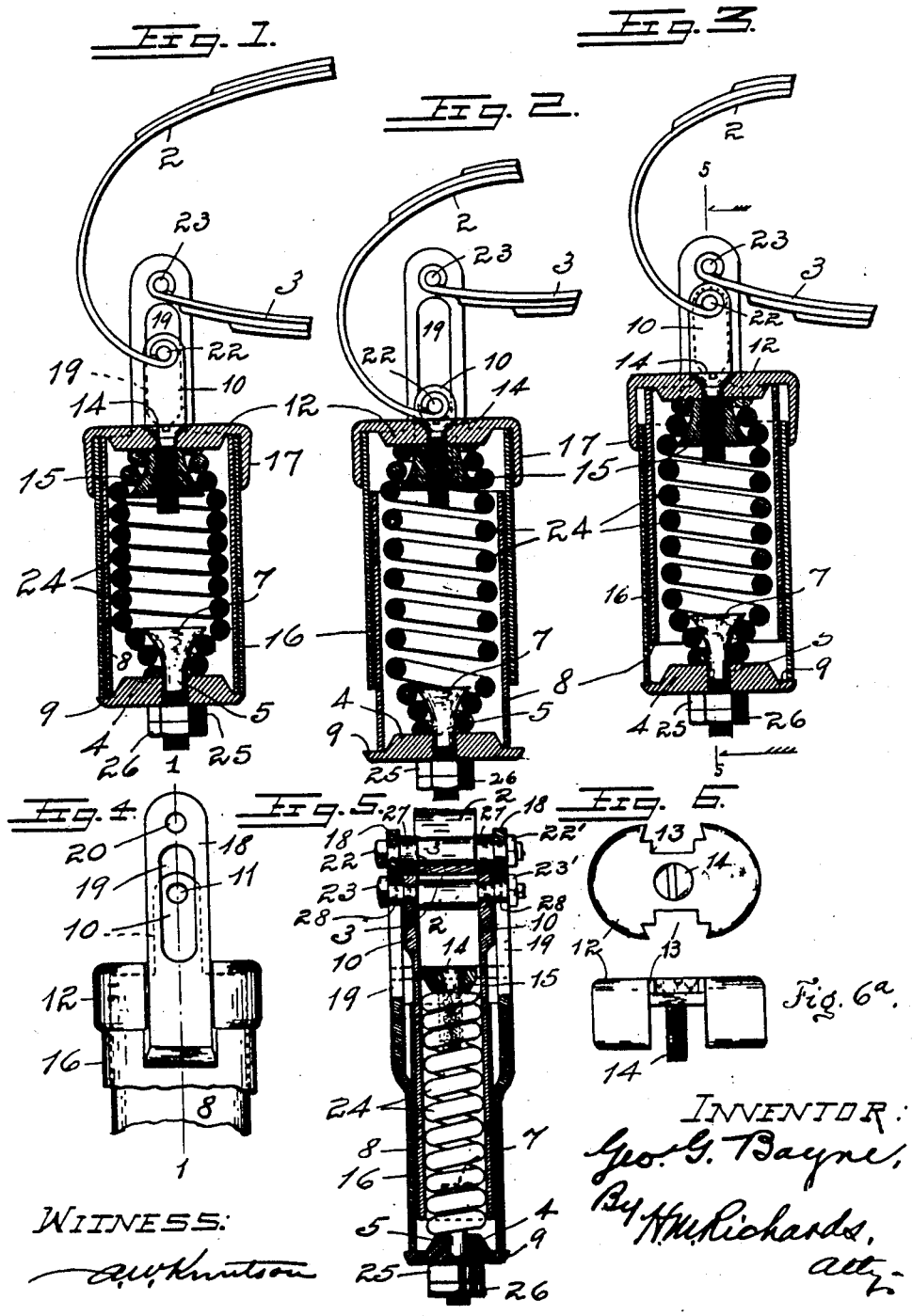

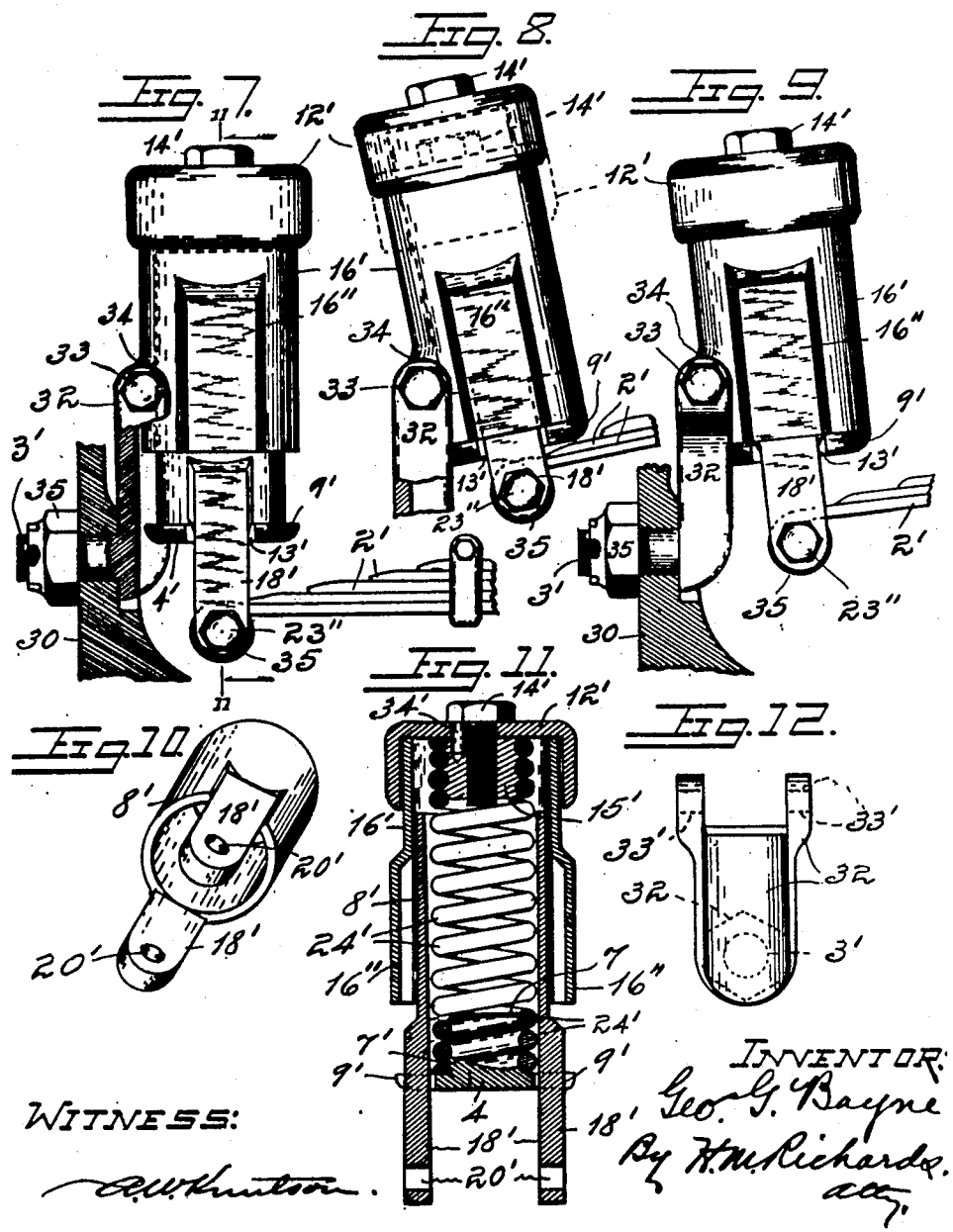

GEORGE G. BAYNE, OF QUINCY, ILLINOIS.

SHOCK AND REBOUND ABSORBER.

1,201,431.

Specification of Letters Patent. Patented Oct. 17, 1916.

Application filed August 10, 1915. Serial No. 44,712.

*To all whom it may concern:*

Be it known that I, GEORGE G. BAYNE, a citizen of the United States, (whose post-office address is Quincy, in the county of Adams and State of Illinois,) have invented a new and useful Shock and Rebound Absorber, of which the following is a specification.

My present invention relates to devices attachable to automobiles and other vehicles, which devices are adapted to absorb the shock which, when some kindred device is not employed, occurs when the vehicle passes over depressions, elevations or other obstructions.

The principal object of the invention is to provide a device which will effectively overcome the jarring termination of the rising and falling movements of the car body—the shock and the rebound.

It is an object to so construct the device that it may be quickly and effectively attached to or detached from a vehicle, even by a novice.

Another object is to so construct the device that it is dirt, dust and moisture-proof.

Another object is to so construct the device that it may be readily assembled, disassembled, or repaired.

That the elements constituting the means for carrying out the objects above recited be durable, strong and simple is a prime requisite, and to constitute such means constitutes another object.

The objects, therefore, concisely stated, are to generally improve the construction and to increase the capacity, utility and efficiency of devices of this character.

To the attainment of the foregoing ends, and objects the invention relates to the peculiar construction, certain novel combinations, and particularly to the new adaptation of elements hereinafter described.

In the accompanying drawings, which illustrate a preferred and a modified type of absorber embodying my invention, and in which like and similar parts are designated respectively by like and similar reference characters: Figure 1 is a vertical longitudinal section, taken in the plane of the line 1—1 in Fig. 4, showing the preferred embodiment of my improvements; Fig. 2, a similar view, but the elements shown in shock-absorbing positions; Fig. 3, a similar view, but the elements shown as in rebound-absorbing positions; Fig. 4, a side elevation—a fragmental detail of the cap or head, the telescoping casing-members and the ears thereon; Fig. 5, a longitudinal vertical section, taken in the line 5—5 in Fig. 3; Fig. 6, a top plan of the cap or head; and Fig. 6ª, a side elevation thereof. Figs. 7 to 12 inclusive show modifications. In these: Fig. 7 is an elevation, the device shown as in shock-absorbing position; Fig. 8, a similar view, the device shown as in rebound-absorbing position; Fig. 9, a similar view, showing the device as in normal position; Fig. 10, a perspective detail of the inner casing-member; Fig. 11, a vertical section, taken in the plane of the line 11—11 in Fig. 7; and Fig. 12, a detail of the casing-supporting bracket.

Coming now to a detailed description of said drawings, and referring to the elements and, where necessary, to the parts thereof, each by a distinguishing reference numeral, uniformly employed, 2 designates the upper and 3 the lower member of an ordinary elliptic spring used on automobiles.

4 designates a foot having a central aperture for the reception of the stem of a spring-engaging bolt 5 having a flared oblong head 7.

8 indicates a casing-shell normally seated on the flange 9 of the foot 4 and having oppositely disposed ears 10 provided with registering eyes 11—see Fig. 4.

12 indicates a head or cap having in each of its sides a way 13 and having also a centrally arranged countersunk aperture which receives the conical head of a screw 14 which engages a flared spring-engaging nut 15.

16 indicates a casing-shell enveloping the shell 8 and also seated normally on the foot 4. These telescoping casing members 8 and 12 are shown as oblong-curvilinear in cross section, but they may be of any other desired cross sectional outline. The upper edge of each bears normally against the top of the head 12, which I have shown as provided with an annular water-shedding flange 17 that may be omitted if preferred. The shell 16 is provided with oppositely arranged ears 18 having each a slot 19 and an eye 20. A bolt 22 passes through the eye of the spring 2 and through the eyes 11, and a bolt 23 passes through the eye of the spring 3 and through the eyes 20.

22' and 23' designate respectively the nuts on said bolts.

24 designates a coiled spring the lower coils of which are constricted and embrace the flared head of the screw 5 and the upper coils of which also are constricted and embrace the flared nut 15.

25 indicates a securing-nut and 26 a lock-nut.

27—27 designate spacers, and 28—28 indicate spacer-bushings seated in the slots 19 and mounted on the bolts 23.

Assume the elements to be in their normal positions, as shown in Fig. 1, wherein the spring 24 is shown as having sufficient contractile energy to draw the head 12 and foot 4 snugly against the ends of the telescoping casing-members 8 and 16. The automobile body is supported on the spring-member 2. When said body "drops" the eye of the springs 2 will bear downward on the bolts 22 to force the casing-member 8 downward relatively to the member 16, which latter also drops but neither as rapidly nor to so great an extent as does the member 8, which latter will carry with it the foot 4 and said foot will draw with it the spring-engaging bolt 5 and thereby the lower end portions or coils of the spring 24, to ease the downward movement of the car body, and thereby prevent the shock which would otherwise occur. The spring 2 which in this operation was greatly expanded will now have a tendency to very rapidly return to and beyond its normal position and thereby cause a disagreeable rebound. This jar or rebound will be resisted and offset by reason of the bolt 22 being drawn upwardly and taking with it the ears 18 and casing member 8. Simultaneously the entire device is moving bodily upward, but at a less rate of speed and not to so great an extent as are the elements 8 and 10. Therefore the element 8 will force the head 12 upward and the upper coils of the spring 24 will be drawn upon by the screw-head 14, and the resistance of said spring 24 will ease the upward movement and thus prevent a sudden rebound jar. Upon reaching the extreme rebound position shown in Fig. 3, and just above described, all of the springs will have a tendency to, and will return to their normal positions, shown in Fig. 1, without shock or jar.

Now see Figs. 7–12 inclusive. 30 designates a part of the automobile frame, provided with an aperture which receives the threaded projection 3' of a bifurcated casing-supporting arm 32 having apertures 33' for the passage of a pivot-bolt 33' which passes also through the eye of a boss 34 on a casing-member 16' having diametrically opposite pockets 16''. 35 indicates a nut engaging the projection 3'. A nut, not shown, engages a bolt 33 in the ordinary manner. 12'' indicates a head or cap seated over the casing-member 16'. 8' designates an inner casing-member (shown best in Fig. 10) comprising a cylinder having ears 18' each of which is provided with an eye 20'. A half-elliptic spring 2' is engaged by a bolt 23'' with the eyes 20'. 4' designates a foot having a flange 9' and a threaded stem 7' which is engaged by the screw-like coils of a spring 24'. The head 12' is provided with a central aperture for the passage of the stem of a bolt 14' the threads of which engage the interiorly-cut threads of a nut 15', the exteriorly-cut threads of which are engaged by the upper coils of the spring 24'. 34 indicates a pin slipped through registering openings in the cap 12' and nut 15'. It is to be noted that the elements 2' and 3', are similar in function to the elements 2 and 3. Assume the elements to be in the normal positions shown in Fig. 9. When the automobile body sinks or "drops", the eye 35 of the spring 2' will be depressed and by means of the bolt 23'' and ears 18' (which move in the ways 13' in the flange 9') will draw down the casing-member 8', and this bearing on said flange will cause the projection 7' to draw the lower coils of the spring 24' downward, whereby to overcome the shock, the parts now occupying the relative positions shown in Fig. 7. Instantly thereupon, both springs will tend to return to and past their normal positions, as shown in Fig. 8, thus permitting the eye 35 to rise somewhat higher than when the ordinary link connection is used, and the short extent of movement permitted by which connection causes the objectionable rebound jar or shock. It will be evident that in the upward movement the ears 18' pass into the pockets 16'', and that the upper end of the casing-member 8' strikes and forces the head 12' upward, said head carrying with it the nut 15' which will draw the upper coils of the spring 24' likewise, the resistance of said spring overcoming the shock which would otherwise occur. After the parts have reached the extreme rebound position the springs 2' and 24 will quickly but without shock reassume their normal positions.

In the foregoing description I have referred to some of the modes which might be adopted in the practice of my invention, but have not endeavored to disclose all which might be employed, the object of this specification being to instruct others skilled in the art to carry out the invention and to fully understand its nature; therefore I desire it distinctly understood that specific disclosure of the one modification is in no manner intended to exclude others not referred to but which are within the scope of the appended claims.

I therefore claim as my invention the following, to-wit:—

1. The combination with a vehicle-spring, of a shock and rebound absorber including a coil-spring, means connected with the vehicle-spring and with the coil-spring for expanding the latter from its lower end while its upper end is held relatively stationary, and means connected with the vehicle-spring and with the coil-spring for expanding the latter from its upper end while its lower end is held relatively stationary.

2. The combination with a vehicle spring, of a coil-spring, tubular means in which said coil-spring is contained, a head normally closing one end of said tubular means, a foot normally closing the other end thereof, said coil-spring connected with both said head and foot, and said vehicle-spring adapted to alternately move said head and foot in opposite directions whereby to elongate said coil-spring from one and then from the other of its ends.

3. The combination with a vehicle-spring, of telescoping casing-members one of which is connected with said vehicle-spring, an absorber-spring, arranged therein, means actuable by one of said casing-members for drawing on one end portion of said absorber spring to elongate it, and means actuable by the other casing members for drawing on the other end of said absorber spring to elongate it, said operations being alternate.

4. The combination with a vehicle-spring, of telescoping casing-members one of which is connected with said vehicle-spring, an absorber-spring, arranged therein, means actuable by one of said casing-members for drawing on one end of said absorber spring to elongate it, means actuable by the other casing-member for drawing on the other end of said absorber spring to elongate it in the opposite direction, said drawing operations being performed alternately and that end of the absorber spring which is not drawn upon in the respective operations being then held stationary.

5. In a shock and rebound absorber, and in combination with a vehicle-spring, a coil-spring, means for elongating it from one of its ends whereby to absorb shock, and means for elongating it from its other end whereby to absorb rebound.

6. In a shock and rebound absorber, the combination with a vehicle-spring, of telescoping tubes, and a coil spring in one of said tubes, said vehicle-spring adapted to move one of said tubes to thereby expand the coil-spring from one of its ends and to move the other tube to expand the coil-spring from its other end.

7. The combination with a vehicle-spring, of telescoping tubes, a movable head normally closing one end thereof, means for closing their other ends, a coil-spring in one of said tubes, and means interposed between said vehicle-spring and head whereby to move one of said tubes and thereby elongate the coil-spring.

8. The combination with a vehicle-spring, of telescopic tubes, and a coil-spring arranged in one of said tubes and one of its ends adapted to be drawn into the other tube when the tubes are extended, the movement of the vehicle-spring in one direction drawing on the upper end of the coil-spring and thereby elongating it, while its lower end is held relatively stationary, and the movement of the vehicle-spring in the contrary direction drawing on the lower end of said coil-spring and thereby elongating it, while its upper end is held relatively stationary.

9. The combination with a vehicle-spring, of telescopic tubes, and a coil-spring arranged in one of said tubes and one of its ends adapted to be drawn into the other tube when the tubes are extended, the movement of the vehicle spring in one direction drawing on the upper end of the coil-spring and thereby elongating it, while its lower end is held relatively stationary, and the movement of the vehicle-spring in the contrary direction drawing on the lower end of the coil-spring and thereby elongating it, while its upper end is held relatively stationary, said tubes being alternately moved, whereby to be extended in length, simultaneously with said movements of the springs.

10. The combination with a vehicle-spring, of telescoping tubes both of which are connected therewith, and a coil-spring in said tubes, said vehicle-spring adapted to force one of said tubes in one direction and thereby elongate one end portion of said coil-spring, and to force the other one of said tubes in the opposite direction and thereby elongate the other end portion of said coil-spring.

11. Combined in a device of the nature described, telescoping casing-members, a cap surmounting them and provided with vertically arranged ways disposed opposite each other, a foot on which both of said casing members normally rest, a conical element secured to said cap, a conical element secured to said foot, an absorber-spring engaged with both of said elements, each of said casing members provided with oppositely disposed vertically arranged pairs of ears one pair of which slides in said ways, and a vehicle-spring engaged with both of said pairs of ears.

12. Combined in a device of the nature described, telescoping casing-members, a cap surmounting them and provided with vertically arranged ways disposed opposite each other, a foot on which both of said casing-members normally rest, a coil-spring-engaging element secured to said cap, a coil-spring-engaging element secured to said foot, a coil-spring engaged with the two elements last recited, each of said casing-members provided with oppositely disposed ears in pairs, one of said pairs of ears slidable in said ways, and a vehicle-spring engaged with both of said pairs of ears.

In testimony whereof I hereto affix my signature, this fourth day of August, 1915.

GEORGE G. BAYNE.

Copies of this patent may be obtained for five cents each, by addressing the "Commissioner of Patents, Washington, D. C."